United States Patent
Tang

(10) Patent No.: US 8,537,369 B1
(45) Date of Patent: Sep. 17, 2013

(54) METHOD AND APPARATUS FOR MEASURING THE SHAPE AND THICKNESS VARIATION OF A WAFER BY TWO SINGLE-SHOT PHASE-SHIFTING INTERFEROMETERS

(75) Inventor: Shouhong Tang, Santa Clara, CA (US)

(73) Assignee: KLA Tencor, Milpitas, CA (US)

(*) Notice: Subject to any disclaimer, the term of this patent is extended or adjusted under 35 U.S.C. 154(b) by 286 days.

(21) Appl. No.: 12/836,558

(22) Filed: Jul. 14, 2010

Related U.S. Application Data

(60) Provisional application No. 61/226,257, filed on Jul. 16, 2009.

(51) Int. Cl.
*G01B 11/02* (2006.01)

(52) U.S. Cl.
USPC .......................... 356/503; 356/511

(58) Field of Classification Search
USPC ................. 356/503, 505, 506, 511
See application file for complete search history.

(56) References Cited

U.S. PATENT DOCUMENTS

| | | | |
|---|---|---|---|
| 5,995,226 A * | 11/1999 | Abe et al. | 356/511 |
| 6,847,458 B2 | 1/2005 | Freischlad et al. | |
| 7,009,696 B2 | 3/2006 | Sullivan et al. | |
| 7,057,738 B2 | 6/2006 | Millerd et al. | |

OTHER PUBLICATIONS

"Interferometer for testing in vibration environments", Proceedings of SPIE vol. 4777, 2002, p. 311-322.*

* cited by examiner

*Primary Examiner* — Tarifur Chowdhury
*Assistant Examiner* — Jonathon Cook
(74) *Attorney, Agent, or Firm* — Deborah Wenocur

(57) ABSTRACT

A method and system is disclosed for utilizing two single-shot phase shift interferometers to simultaneously measure wafer shape and thickness variation of two sides of a wafer. This system is able to extract the front height, the back height, and the thickness variation of a wafer in a single data acquisition.

This system, when utilized with a fast shutter speed, decreases the insensitivity to vibration. Algorithms are introduced that extract the true thickness variation of a wafer even when the wafer is vibrating.

The effects of air turbulence can be reduced by a phase averaging technique.

17 Claims, 4 Drawing Sheets

METHOD AND APPARATUS FOR MEASURING THE SHAPE AND THICKNESS VARIATION OF A WAFER BY TWO SINGLE-SHOT PHASE-SHIFTING INTERFEROMETERS

CROSS REFERENCE TO RELATED APPLICATION

This application is related to U.S. Provisional Application No. 61/226,257, filed Jul. 16, 2009, and claims priority therefrom.

FIELD OF THE INVENTION

This invention is related to measurement of semiconductor wafers, and in particular to measurement of wafer thickness and shape variation using interferometers.

BACKGROUND

Thin polished plates in the form of silicon wafers are a very important part of modern technology. The requirements for flatness and thickness uniformity of these wafers are becoming more and more stringent as the printed device feature sizes are shrinking. Therefore, the metrology of these parameters is very important for development and manufacturing. Other examples for opaque polished plates are: magnetic disc substrates, gauge blocks, and the like. While the technique described here refers mainly to wafers, it is to be understood that the technique also is applicable to other types of test pieces with comparable characteristics.

Rapid and accurate simultaneous measurement of the surface height of the two sides of the wafer, and thickness variation of the wafer, is desirable for several reasons. Simultaneous measurement improves throughput, an important consideration. Another key advantage to two-sided simultaneous measurement, specifically utilizing two interferometers facing two sides of the wafer, is illustrated in FIG. 1 Wafer 100 is positioned in a cavity 103 between reference planes A(105) and B(110), which are separated by distance C(x,y) (115). At any vertical position, wafer thickness f(x,y) (120) equals distance C(x,y) minus the sum of distances $d_B(x,y)$ (125) and $d_A(x,y)$ (130) from the wafer surfaces to the reference planes.

A first method of measuring the wafer thickness uses two temporal phase shifting Fizeau inferferometers at substantially normal incidence to the wafer surface, to simultaneously obtain two single-sided distance maps between each side of a wafer and corresponding reference flats, and compute thickness variation and shape of the wafer from these data and a calibrated distance map between the two reference flats. This method is described in commonly owned U.S. Pat. No. 6,847,458, issued Jan. 25, 2005, which is hereby incorporated by reference in its entirety. In this patent, and summarized in FIG. 1, equation 140, it is shown that when measuring the wafer thickness using phase shifting interferometers to simultaneously measure the surface height on the two surfaces, the thickness measurement is independent of the flatness of the reference plates.

Accordingly, such a system is able to measure the thickness variation of a wafer without errors resulting from cavity path difference or from the shape of the reference flats. This method has been successfully used in the WaferSight measurement tool by KLA-Tencor.

The measurement principles summarized and illustrated in FIG. 1 are outlined below:

Principle of Measurements $\Phi_A$: The calculated fringe phase of the interferogram recorded by the A side interferometer. For any point (x,y) in the phase map, it is related to the distance between the front surface of wafer and the front surface of reference flat, or $d_A(x,y)$ by $$d_A(x, y) = \frac{\lambda}{4\pi}\phi_A(x, y) + 2N\pi \tag{1}$$

where $\lambda$ is the wavelength and N is an unknown integer. Since the unknown N is related to a constant height offset of the measurement surface, it is omitted from the interferometric measurement. Thus equation (1) becomes $$d_A(x, y) = \frac{\lambda}{4\pi}\phi_A(x, y) \tag{2}$$

Note that the equation (2) implies that the surface height computed from an interferometer carries relative height information of measuring surface only.

Similarly, $\Phi_B$ is the calculated fringe phase of the interferogram recorded by the B side interferometer and $$d_B(x, y) = \frac{\lambda}{4\pi}\phi_B(x, y) \tag{3}$$

$\Phi_C$ is the calculated fringe phase of the interferogram recorded by either the A or B side interferometer and $$C(x, y) = \frac{\lambda}{4\pi}\phi_c(x, y) \tag{3}$$

From the figure, we can find the thickness $$f = C - d_A - d_B \tag{4}$$

This yields $$\phi_f = \phi_c - \phi_A - \phi_B \tag{5}$$

Equation (5) is the key formula used in Wafersight and the present invention to calculate the phase that is related to the wafer thickness f:

$$f(x, y) = \frac{\lambda}{4\pi}\phi_f(x, y) + 2N\pi \tag{6}$$

Since we do not know the integer N, we compute the wafer thickness by $$T(x, y) = \frac{\lambda}{4\pi}\phi_f(x, y) \tag{7}$$

Since the constant height offset of the measuring surface is omitted, the T we obtained by equation (7) is the wafer thickness variation, not the wafer thickness f.

Now let us take a look at equation (5). Before measuring the wafer, we measure a cavity map $\Phi_C$ without the tilt fringe first. This is because we can only measure the cavity area that is not blocked by the wafer. This implies that the phase $\Phi_C$ is measured at a time that is different from the time the $\Phi_A$ and $\Phi_B$ are measured. During the time difference, the spatial phase tilt may add in the cavity phase due to the reference flat move. That is why it is so important to have reference flats bigger than the wafer size so that we are able to compute the spatial phase tilt during the wafer measuring time to remove it.

A second method of measuring the surface height on both sides of a wafer, as well as its thickness variation, is described in commonly owned U.S. Pat. No. 7,009,696, issued Mar. 7, 2006, which is hereby incorporated by reference in its entirety. This method combines two grazing incidence temporal phase shifting interferometers, simultaneously obtaining front- and backside topography data, and computing thickness variation and shape of the wafer from these data. Multiple measurements of portions of the wafer are stitched together to obtain full wafer topography data maps. A flat bar in close proximity to portions of one side of the wafer provides a damping arrangement which reduces unwanted wafer vibrations during measurement. Unlike the first method, the wafer thickness variation extracted using this second method is influenced by the reference flat shape.

A refinement of the aforementioned systems and methods provides less sensitivity to vibration and air turbulence. Any method requiring multiple temporal phase-shifted frames of interferometric fringes to compute the fringe plane requires the phase-shifted frames to be taken at different times. As a result, environmental changes make phase shifts between frames deviate from what is desired. Furthermore, the second prior method has a long, non-common optical path length between the object and the reference, and is therefore more susceptible to air temperature gradients, i.e., air turbulence.

It has been recognized by the inventor, (who participated in the development of the system of U.S. Pat. No. 6,847,458, i.e. Method 1), that single shot interferometers can be utilized to perform wafer thickness measurements in the same way as the system that uses the temporal phase shifting interferometers, to preserve the insensitivity to deviations from flatness of the reference plates, and at the same time provide robustness to vibration and air turbulence. Single shot interferometers are described in one embodiment in U.S. Pat. No. 7,057,738, issued Jun. 6, 2006, which is hereby incorporated by reference in its entirety.

Single shot interferometers, including (but not limited to) spatial carrier interferometers, and simultaneous phase shifting interferometers, are able to perform accurate phase measurement of interferometric fringes by a single shot of data acquisition, in contrast to temporal phase shifting interferometers, which require multiple interferogram frames to compute the fringe phase. The single shot method thereby reduces the effects of vibration and air turbulence. Single shot interferometers have been widely used for testing large optics. They have not previously been utilized for wafer thickness measurement.

It has not been previously recognized or implemented that two such single shot interferometers can be utilized to measure wafer shape and thickness variation of two sides of a wafer simultaneously.

SUMMARY

A method and system is disclosed for utilizing two single-shot phase shift interferometers to simultaneously measure wafer shape and thickness variation of two sides of a wafer.

This system is able to extract the front height, the back height, and the thickness variation of a wafer in a single data acquisition.

The inventive system can utilize general one-shot phase shift interferometers, is not constrained to a specific type thereof.

This system, when utilized with a fast shutter speed, decreases the insensitivity to vibration. Algorithms are introduced that extract the true thickness variation of a wafer even when the wafer is vibrating.

The effects of air turbulence can be reduced by a phase averaging technique.

DETAILED DESCRIPTION

The inventor of the instant invention has recognized that the wafer vibration can be cancelled out in wafer thickness variation computations if all of the following requirements are met:

A. The phases of two instantaneous interferograms, one on each side of the wafer, can be extracted accurately or the phase of a single interferogram acquired within a fraction of a camera frame time can be calculated with high accuracy.

The pixel integration time, e.g. for a 30 fps camera, is 1/30 second. For an instantaneous interferometer, the pixel integration time can be set to a value as small as 1/2000 second or smaller by adjusting the camera shutter speed. An interferogram or an intensity frame is acquired within the integration time.

The one-shot phase-shifting interferometers (described interchangeably herein as "instantaneous phase-shifting interferometers") as in the present invention each require only one such instantaneous interferogram to extract the fringe phase, while temporal phase-shifting interferometers need multiple interferograms over the time of multiple camera frames. This implies that the instantaneous phase-shifting interferometer can finish acquiring data within a fractional frame time while others such as temporal phase shifting interferometers cannot.

Environmental vibration moves fringes or changes the fringe phase of an interferometer. As a result, in order for the interferometer to be substantially immune to environmental vibration, it is crucial that all required data acquisition be completed within a fraction of a camera frame time so that the fringes are "frozen" or the fringe phase change is very small.

B. The two instantaneous interferograms of point 1., one for the front and the other for the backside of wafer, must be contemporaneous, i.e., acquired at the same start time, within a fraction of a camera frame time.

C. The cavity shape is known, or the phase or distance information between two reference plates are available.

Because each side of the instantaneous phase-shifting interfermometer acquires only one instantaneous interferogram and determines its phase, the inventor has recognized that the vibration effect can be canceled out if the data from both sides are acquired at the same starting time. This is because the wafer vibration moves the front and back wafer surfaces by the same amount. The wafer vibration height change V cancels out from the wafer thickness calculation in a similar way to the earlier described canceling out of the reference plane shape for the WaferSight configuration:

Assume the cavity map is C,

The A side surface map is $H_a$=true surface height A+vibration height change V;

The B side surface map is $H_b$=true surface height B−vibration height change V;

The wafer thickness map T is calculated by $$T=C-(H_a+H_b)=C-(A+v+B-v)=C-(A+B).$$

Figure 1:
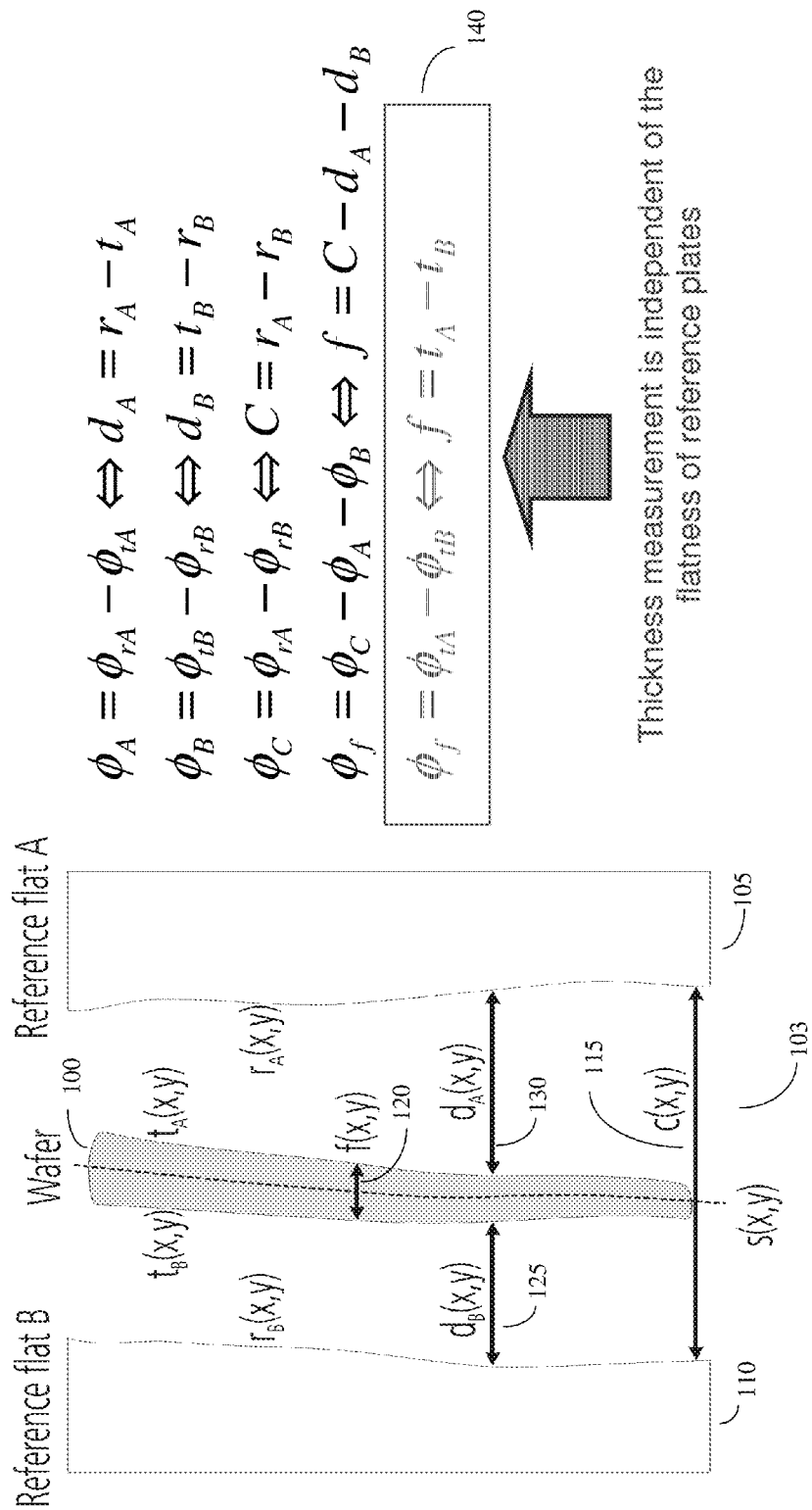
FIG. 1 illustrates the insensitivity of simultaneous two-sided wafer thickness measurement with phase-shifting interferometers to cavity reference geometry.

Note that in this case the vibration term cancels out, similarly to the canceling out of the reference plane shape terms in the earlier shape calculations shown in FIG. 1, equation 140.

As one of the inventors of U.S. Pat. No. 6,847,458 describing Method 1, the inventor of the instant invention is familiar with systems that use two interferometers, one for the front and the other for the back side of wafer, to compute the wafer thickness variation in a way that is independent of the shape or flatness of two reference flats. This familiarity and understanding includes understanding the limitations of the systems that use temporal phase shift interferometers, such as the systems used in method 1 and method 2. Those systems require multiple intensity frames or interferograms that have to be acquired at different times in order to compute the phase. Thus those systems cannot meet above-mentioned requirements A and B. The inventor has recognized that two single shot interferometers as described can be integrated into a system which does meet all of the above requirements and can thereby cancel out wafer vibration. It has been further recognized that one can take advantage of the fact that the phase can be obtained quickly, in one single shot, using such interferometers. Thus, when combined with a phase averaging technique, such a system using two single shot interferometers can be very effective in minimizing the measurement error resulting from air turbulence.

A phase averaging technique improves the accuracy of the phase measurement by suppressing the influence of noises existing at each phase map, as follows:

Each phase can be computed n times, with n measurements. For the n measurements, the average phase is calculated by $$\text{Average phase}=(\text{phase}_1+\text{phase}_2+\text{phase}_3+\ldots+\text{phase}_n)/n,$$

where $\text{phase}_1$ is the phase obtained from the first measurement, 2 for second measurement, etc. Assume the precision for each phase is sigma, the precision of the average phase (according to the statistics) is sigma/sqrt(n), which is better than sigma, since n>1.

Since the instantaneous phase-shifting interferometer can compute the phase within one camera frame time as described above, it is able to calculate the average phase much more quickly than can be achieved for temporal phase-shifting interferometers.

Figure 2:
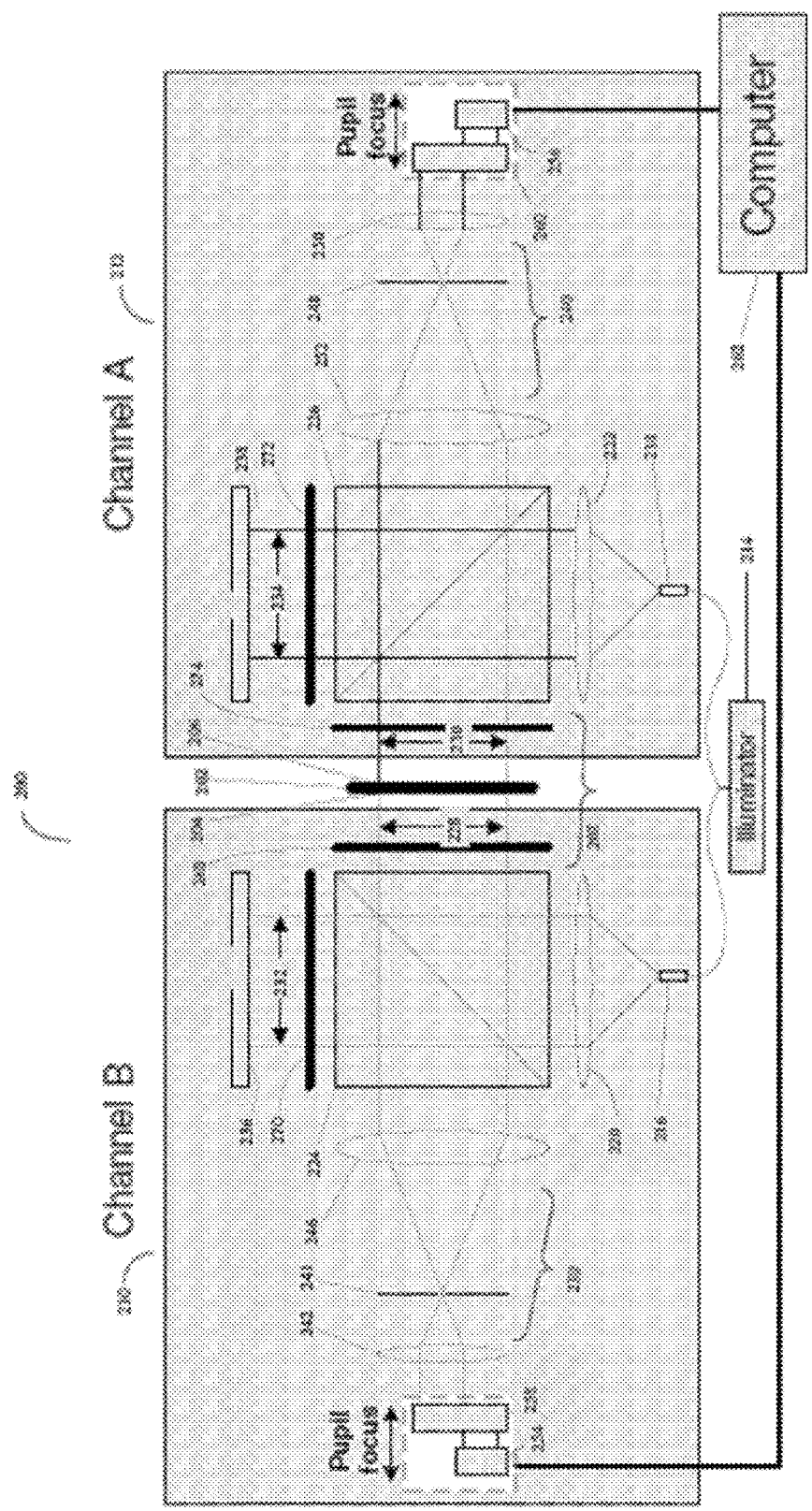
FIG. 2 is a diagrammatic representation of a preferred embodiment of the inventive system.

FIG. 2 shows a diagram of a preferred embodiment of the inventive system 200. Wafer 202 having surfaces 204, 206 is positioned in region 208 between two interferometers 210, 212, each having single shot phase-shifting technology. Interferometers 210, 212 may alternately be referred to as Channel A and Channel B. In an exemplary implementation of the system, the interferometers are similar to the one presented in K. Freischlad, R. Eng, and J. Hadaway, "*Interferometer for Testing in Vibration Environments*", Proc. SPIE, Vol. 4777, 311 (2002), which is hereby incorporated by reference in its entirety. This exemplary implementation, utilizing Twyman-Green interferometers, is described hereafter.

Illuminator 214 provides illumination for Channels A and B through fibers 216, 218. Illuminator 214 may consist of a single light source or of multiple light sources with different coherence lengths, or white light. The light diverging from fibers 216, 218 passes through lenses 220, 222, wherein it is collimated with a beam diameter larger than the wafer diameter. Polarization Beam Splitters (PBS) 224, 226 split the collimated light beams into test beams 228, 230 which are reflected from wafer surfaces 204,206 and back to PBS 224, 226; and reference beams 232, 234 which are reflected from reference flat minor surfaces 236, 238, and back to PBS 224, 226. Test and reference beams are recombined at the PBS (quarter wave plates 268, 270, 272, 274 in both beams ensure substantially 100% light efficiency for the beam recombination) and then pass through high precision relays 239, 240 that are the assemblies of 241, 242, 246, and 248, 250, 252. The relays contain lenses 242, 246, 250, 252, and additionally field stops 241, 248 to limit the angular acceptance range that matches the Nyquist frequency of cameras 254, 256. After the beams pass through relays 239, 240, they enter prism assemblies 258, 260 that generate interferograms whose phases relate to the optical path difference between the test beams and the reference beams, with additional phase that is tilted spatially. The interferograms are then recorded by cameras 254, 256, that send them to computer 262 for processing to produce the desired information such as the shape and thickness variation of wafer 202.

Note that the configuration of FIG. 2 has reference planes 236, 238 perpendicular to wafer 202, rather than parallel to the wafer as in FIG. 1. A quantity L compatible with cavity separation C of FIG. 1 can be defined for this configuration. L(x,y) is defined relative to the difference in distance between the reference plane and the diagonal plane of beam splitters 224, 226, and the distance between the wafer plane and the diagonal beam splitter plane, for any point (x,y) on the diagonal beam splitter plane. Similarly to the cavity map of FIG. 1, the map of L(x,y) has a fixed shape that depends on the shapes of reference planes 236, 238. While the shape of the cavity can be directly computed for the WaferSight configuration of FIG. 1, the shape of L(x,y) must be obtained by system calibration, and from that a calibrated phase map C can be obtained.

In an embodiment, the single-frame phase acquisition is based on a spatial carrier technique. The spatial carrier fringe is generated by the prism assemblies and acquired by the cameras. These acquired images of the spatial carrier fringes are then formed into phase maps by a single-frame phase computing technique. An embodiment of this technique is described in M. Takeda, H. Ina, S. Kobayashi, "*Fourier-transform Method of Fringe Pattern Analysis for Computer-based Topography and Inteiferometry*", J. Opt. Soc. Am 72, 156-160 (1982), which is hereby incorporated by reference in its entirety.

Figure 3:
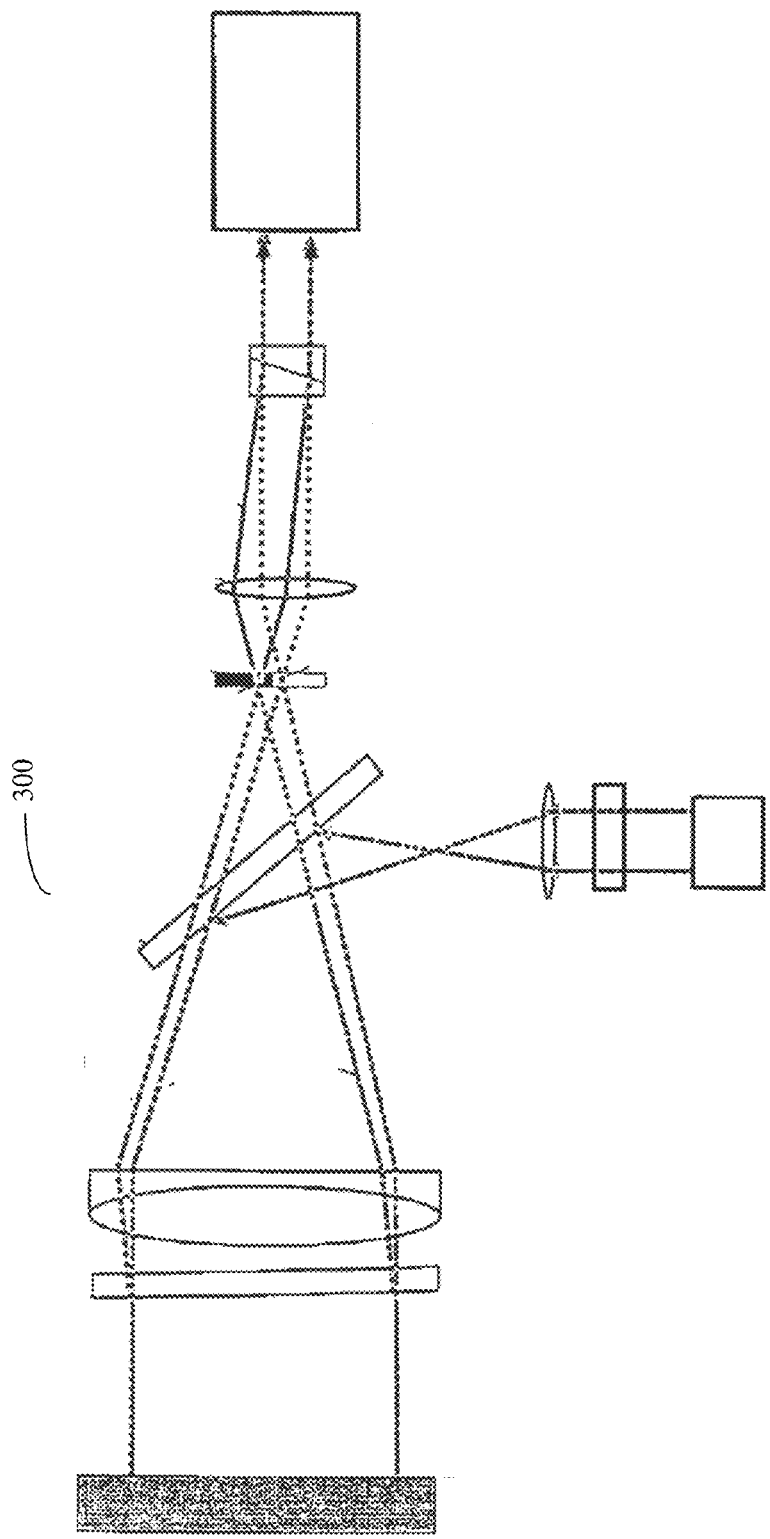
FIG. 3 illustrates an alternate embodiment of the one-shot interferometers used in the inventive system.

FIG. 3 illustrates an alternate embodiment of the inventive system. Interferometers 210, 212 can be replaced by any interferometers with single shot phase-shifting technology such as interferometer 300. Interferometer 300 is a simultaneous phase-shifting Fizeau interferometer which is described in U.S. Pat. No. 7,057,738 by Millerd et al, issued Jun. 6, 2006. U.S. Pat. No. 7,057,738 is hereby incorporated by reference in its entirety.

Figure 4:
FIG. 4 is a flow diagram describing use of the two interferometers to compute wafer shape and thickness information.

FIG. 4 is an exemplary flow diagram describing use of the two interferometers to compute wafer shape and thickness information. In step 400, calibrate the characteristics of the reference flats 236 and 238, yielding calibrated phase map C. In step 405, place a wafer into region 208 between the interferometers, in the interferometer channels. In step 410, acquire two interferograms simultaneously, one for each side of the wafer. In step 415, obtain phase maps from the two interferograms. In step 420, obtain phase A of the interferogram formed by reference flat 236 in Channel A and front surface 204 of wafer 202. In step 425, obtain phase B of the interferogram formed by reference flat 238 in Channel B and back surface 206 of wafer 202. In step 435, calculate C−(A+B) equals the thickness variation of the wafer, as shown in equation (7). A is directly proportional to the front surface height, B to the back surface height. Interferometers 210, 212 can be replaced by any interferometers with single shot phase-shifting technology. An example thereof, illustrated in FIG. 3, is disclosed in incorporated U.S. Pat. No. 7,057,738. Another example thereof is described in C. Koliopoulos, "*Simultaneous phase shift interferometer*", Proc. SPIE Vol. 1531, 119 (1992).

Computer System Considerations

The inventive methods or portions thereof may be computer-implemented. The computer system may include a processor (e.g. a processor core, a microprocessor, a computing device, etc), a main memory and a static memory, which communicate with each other via a bus. The machine may further include a display unit that may comprise a touchscreen, or a liquid crystal display (LCD), or a light emitting diode (LED) display, or a cathode ray tube (CRT). As shown, the computer system also may include a human input/output (I/O) device (e.g. a keyboard, an alphanumeric keypad, etc), a pointing device (e.g. a mouse, a touch screen, etc), a drive unit (e.g. a disk drive unit, a CD/DVD drive, a tangible computer readable removable media drive, an SSD storage device, etc), a signal generation device (e.g. a speaker, an audio output, etc), and a network interface device (e.g. an Ethernet interface, a wired network interface, a wireless network interface, a propagated signal interface, etc).

The drive unit may include a machine-readable medium on which is stored a set of instructions (i.e. software, firmware, middleware, etc) embodying any one, or all, of the methodologies described above. The set of instructions is also shown to reside, completely or at least partially, within the main memory and/or within the processor. The set of instructions may further be transmitted or received via the network interface device over the network bus.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical, acoustical or other form of propagated signals (e.g. carrier waves, infrared signals, digital signals, etc); or any other type of media suitable for storing or transmitting information.

This invention takes advantage of the fact that

A system with two interferometers facing two sides of the wafer, as in U.S. Pat. No. 6,847,458, is able to measure the surface height on both sides of wafer simultaneously.

A system with two single shot phase-shifting interferometers is able to extract the front height, the back height, and the thickness variation of a wafer in a single data acquisition.

The amount of Out-of Plane Distortion (OPD) increase on one channel of the system due to wafer shape change is identical to the amount of OPD decrease on the other channel or vice versa.

Acquiring data in a single shot of camera with fast shutter speed is insensitive to vibration. A second way to get acquisition time much faster than the camera frame rate is to flash the light source or turn on the light source in a fractional camera frame time.

The effects of air turbulence can be reduced by a phase averaging technique.

A system with two single shot phase-shifting interferometers with equal path between reference and object beams, such as Twyman-Green interferometers, is able to use white light as its light source.

A system with two single shot phase-shifting interferometers is able to measure the thickness variation of a wafer without the errors resulting from the cavity path difference or from the shape of reference flats. (see Equation 5). The same calculation allows the wafer vibration to be cancelled out.

A system with two single shot phase-shifting interferometers and its field of view (FOV) larger than the size of the wafer being measured is able to monitor the tilt change of reference flats with every measurement, which significantly increases the measurement repeatability.

A system with its field of view (FOV) larger than the size of the wafer being measured is able to determine the location of a testing wafer in the imaging plane very precisely without the influence of the surface slopes at the edge of the wafer.

It is not expected that the invention be restricted to the exact embodiments disclosed herein. Those skilled in the art will recognize that changes and modifications can be made without departing from the inventive concept. The scope of the invention should be construed in view of the claims.

With this in mind, I claim:

1. A system comprising:
   a polished opaque plate having a first surface and a second surface opposite said first surface;
   a first single shot phase-shifting interferometer configured to require only one instantaneous interferogram to extract an interferometric fringe phase,
   positioned so that said first polished opaque plate surface is in an interferometer channel of said first phase-shifting interferometer;
   a second single shot phase-shifting interferometer configured to require only one instantaneous interferogram to extract an interferometric fringe phase,
   positioned so that said second polished opaque plate surface is in an interferometer channel of said second phase-shifting interferometer;
   said first and second single shot phase-shifting interferometers configured to provide data sufficient to measure shape of said polished opaque plate and thickness variation of said polished opaque plate; and
   a computer programmed to use an algorithm employing the phase measurement of interferometric fringes to cancel out vibration terms in a calculation of a thickness map of said polished opaque plate;

said computer further programmed to control said first and second single shot interferometers to obtain data acquisition simultaneously with each other.

2. The system of claim 1 wherein said polished opaque plate is a semiconductor wafer.

3. The system of claim 1, wherein said computer is programmed to process said data from said interferometers.

4. The system of claim 3, wherein said computer is programmed to extract shape and thickness variation of said polished opaque plate.

5. The system of claim 4, configured to extract said thickness variation of said polished opaque plate in a single data acquisition.

6. The system of claim 4, configured to reduce effects of air turbulence by phase averaging.

7. The system of claim 3, wherein said single shot interferometers include cameras having shutter speed sufficiently fast to substantially freeze interferometric fringes during vibration of said polished opaque plate.

8. The system of claim 3, wherein said single shot interferometers include a light source flashing sufficiently fast to substantially freeze interferometric fringes during vibration of said polished opaque plate.

9. The system of claim 1, wherein said first and second single shot interferometers are one-shot phase shift interferometers configured to require only one instantaneous interferogram to extract an interferometric fringe phase.

10. The system of claim 1, wherein the Field of View of said system is larger than said polished opaque plate.

11. A method for determining shape and thickness variation of a polished opaque plate comprising:
    positioning a polished opaque plate in a region between interferometer channels of two single-shot phase-shifting interferometers, wherein a first said interferometer faces a first surface of said polished opaque plate, and a second said interferometer faces a second surface of said polished opaque plate opposite said first surface; wherein said first and second single shot phase-shifting interferometers are configured to require only one instantaneous interferogram to extract an interferometric fringe phase;
    acquiring a first instantaneous interferogram from said first surface of said polished opaque plate and simultaneously acquiring a second instantaneous interferogram from said second surface of said polished opaque plate;
    obtaining a first phase map from said first instantaneous interferogram and a second phase map from said second instantaneous interferogram;
    computing a calibrated cavity phase map from reference flats of said first interferometer and said second interferometer;
    using an algorithm employing the phase measurement of interferometric fringes to cancel out vibration terms; and
    calculating shape and thickness variation of said polished opaque plate from said first phase map, said second phase map, and said calibrated cavity phase map.

12. The method of claim 11 wherein said polished opaque plate is a semiconductor wafer.

13. The method of claim 11 including providing an oversized field of view of said polished opaque plate.

14. The method of claim 11, further comprising performing phase averaging.

15. The method of claim 11, wherein said steps of using an algorithm employing the phase measurement of interferometric fringes to cancel out vibration terms; and calculating shape and thickness variation of said polished opaque plate from said first phase map, said second phase map, and said calibrated cavity phase map comprise;
    calculating cavity map C from said calibrated cavity phase map;
    calculating A side surface map $H_a$=true surface height A+vibration height change V;
    calculating B side surface map $H_b$=true surface height B−vibration height change V; and
    calculating wafer thickness variation map T=C−(A+V+B−V)=C−(A+B).

16. A computer programmed to execute the steps of a method for determining shape and thickness variation of a polished opaque plate positioned in a region between interferometer channels of two single-shot phase-shifting interferometers, wherein a first said interferometer faces a first surface of said polished opaque plate, and a second said interferometer faces a second surface of said polished opaque plate opposite said first surface; wherein said first and second single shot phase-shifting interferometers are configured to require only one instantaneous interferogram to extract an interferometric fringe phase; said method comprising the steps of:
    controlling said first and second interferometers to acquire a first instantaneous interferogram from said first surface of said polished opaque plate and simultaneously acquire a second instantaneous interferogram from said second surface of said polished opaque plate;
    obtaining a first phase map from said first instantaneous interferogram and a second phase map from said second instantaneous interferogram;
    computing a calibrated cavity phase map from reference flats of said first interferometer and said second interferometer;
    using an algorithm employing the phase measurement of interferometric fringes to cancel out vibration terms; and
    calculating shape and thickness variation of said polished opaque plate from said first phase map, said second phase map, and said calibrated cavity phase map.

17. The computer of claim 16, wherein:
    said steps of using an algorithm employing the phase measurement of interferometric fringes to cancel out vibration terms; and calculating shape and thickness variation of said polished opaque plate from said first phase map, said second phase map, and said calibrated cavity phase map comprise;
    calculating cavity map C from said calibrated cavity phase map;
    calculating A side surface map $H_a$=true surface height A+vibration height change V;
    calculating B side surface map $H_b$=true surface height B−vibration height change V; and
    calculating wafer thickness variation map T=C−(A+V+B−V)=C−(A+B).

* * * * *